Sept. 3, 1968 H. DYM ET AL 3,400,271

SCANNER EMPLOYING UNILATERALLY CONDUCTING ELEMENTS AND INCLUDING A CIRCUIT FOR GENERATING A POINTED VOLTAGE DISTRIBUTION

Filed June 1, 1965

*INVENTORS*
HERBERT DYM
JOHN W. HORTON
ROBERT J. LYNCH

*BY* Edward G. Fiorito

ATTORNEY 3,400,271

SCANNER EMPLOYING UNILATERALLY CONDUCTING ELEMENTS AND INCLUDING A CIRCUIT FOR GENERATING A POINTED VOLTAGE DISTRIBUTION

Herbert Dym, Mahopac, John W. Horton, New York, and Robert J. Lynch, Lake Peekskill, N.Y., assignors to International Business Machines Corporation, Armonk, N.Y., a corporation of New York Filed June 1, 1965, Ser. No. 460,233
29 Claims. (Cl. 250—211)

This invention relates to electrical circuits used for observing images and more particularly to devices for selectively scanning images in a controlled fashion.

There are several problems associated with scanners such as cathode ray flying spot scanners, orthicon and vidicon tubes. Ordinarily they are large in size, employ high voltages, and are fragile. These problems have been reduced by a device disclosed and claimed in commonly assigned co-pending application Ser. No. 279,531, entitled, "Radiation Scanner Employing Rectifying Devices and Photoconductors," by J. W. Horton and R. J. Lynch, now Patent No. 3,317,733. The present invention is directed to an improvement to the device in the above application permitting greater control in the direction of the scanner, and is related to commonly assigned co-pending application Ser. No. 460,081.

Accordingly it is an object of the present invention to provide an improved scanner employing small, sturdy components.

Another object of the present invention is to provide a scanner having improved directional control.

Still another object of the present invention is to provide an improved scanner capable of holding the region of observation on a stationary point.

A further object of the present invention is to provide an improved scanner capable of changing the size of the region of observation.

Still another object of the present invention is to provide an improved scanner capable of detecting weak radiation inputs.

Another object of the present invention is to provide a voltage generating circuit capable of providing a pointed voltage distribution.

These and other objects of the present invention are accomplished by providing a plurality of circuit groups. The circuit groups may be arranged in a row for scanning an object along a line. Each group includes four unilaterally conducting elements, one of which is either sensitive to or capable of emitting radiation.

The circuit groups are excited by two sources of potential one providing an ascending voltage gradient and the other providing a descending voltage gradient. The row of circuit groups is connected to the potential sources so that the ascending and descending voltage gradients are spread across the length of the row.

In this manner one circuit group is located at a point where the voltage level in each gradient is the same. This circuit group is activated by this condition and responds to any radiation applied thereto, or may emit radiation. The remaining circuit groups are rendered inactive. By adjusting the absolute potential of each voltage gradient the point of equi-potential can be varied along the length of the row of circuit groups.

Present day semiconductor techniques permit the fabrication of circuit groups using layers of semiconductor materials. Unilaterally conducting elements are formed at the junctions between the layers providing a small, sturdy device. An advantage of the present invention is that the area of response of the scanner can be limited to a single point. The point may be swept rapidly across the device, or held stationary for continuous monitoring of a single localized area.

A further advantage of the present invention is the ability to control the size of the area of observation. This may be accomplished by changing the absolute potential of the voltage gradients which are of a relatively low value compared with the voltages employed in cathode ray scanners.

Still another advantage of the present invention is the direct relationship between the output current and the specific region of observation providing an improved ability to detect weak radiation inputs.

The foregoing and other objects, features and advantages of the invention will be apparent from the following more particular description of preferred embodiments of the invention, as illustrated in the accompanying drawings.

Figure 1:
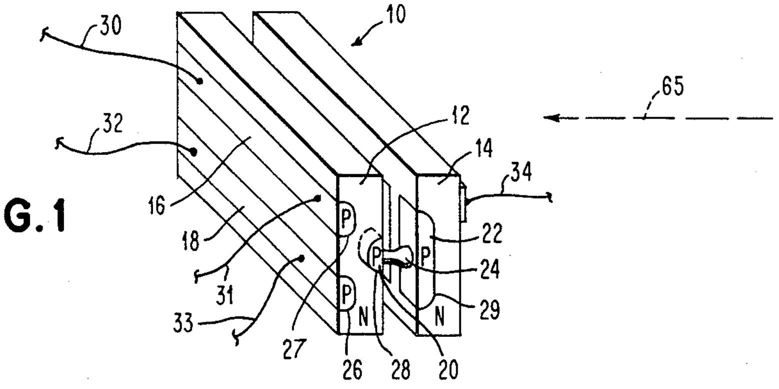
FIG. 1 is a cabinet drawing of a multi-layer semiconductor device embodying the present invention.

FIG. 1 shows a structure 10 including two large layers 12 and 14 of N-type semiconductive material. A pair of strips 16 and 18 in layer 12 is a P-type semiconductor material. A series of P-type regions 20 is situated in layer 12 so that each region 20 is equi-distant from the strips 16 and 18.

A series of discrete regions 22 of P-type semiconductor material is formed in layer 14. A corresponding number of bridges 24 connect the regions 22 to the adjacent regions 20.

Between each of the materials 12, 14, 16, 18, 20, and 22, PN junctions 26–29 are formed as indicated in FIG. 1 having unilateral conducting properties. Junction 29 is also given conductive properties responsive to radiation such as photoconductivity.

Leads 30–33 are connected to strips 16 and 18 so that voltages may be applied thereacross. Strips 16 and 18 exhibits some resistivity in the lateral direction so that voltage gradients are set up as a result of the voltages applied across leads 30–33. Layer 12 is formed of high resistivity material. On the other hand layer 14 is provided with a low resistivity in the elongated direction so that the potential applied to a lead 34 is maintained along the entire length of layer 14. Further details on the technique for fabricating multilayer semiconductor structures may be found in the above copending application Ser. No. 279,531 as well as literature pertaining to this well-known art.

Figure 2:
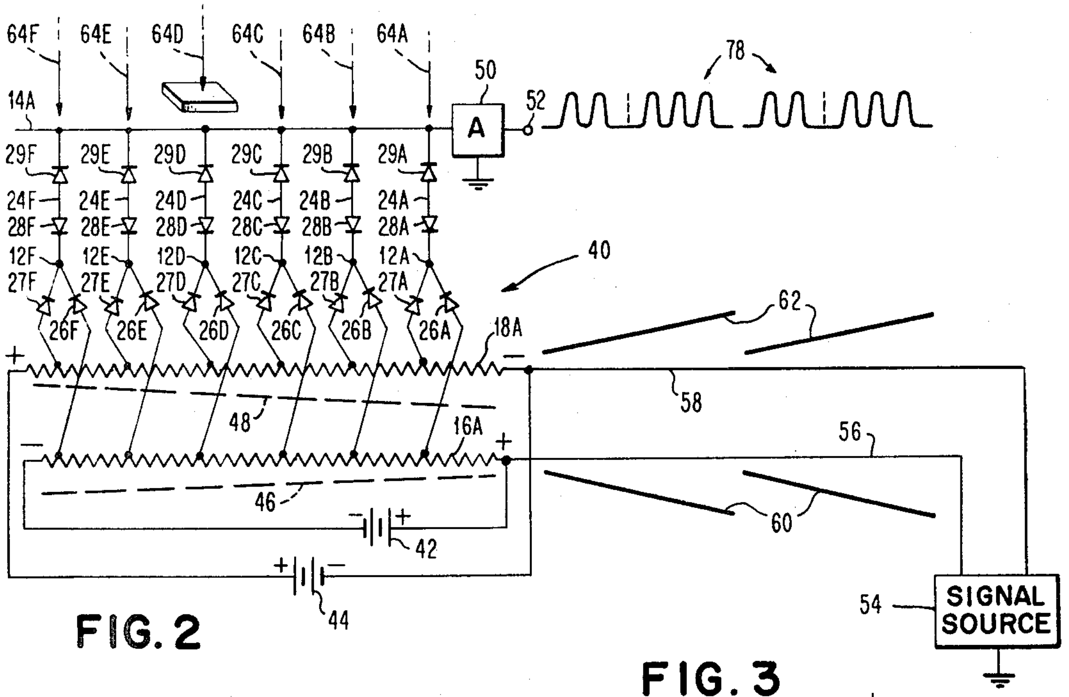
FIG. 2 is an electrical schematic diagram of a circuit embodying the present invention.

The operation of the structure 10 in FIG. 1 is described with reference to a circuit 40 in FIG. 2. The electrical characteristics of the circuit 40 and structure 10 are equivalent, the main physical difference is the use of discrete individual components in circuit 40 and the continuous PN junctions 26 and 27 in structure 10. The components in FIG. 2 are given the same numerical designations as the corresponding elements in structure 10. A series of diodes 29A–29F correspond to the PN junctions 29 in FIG. 1 correspond to a series of connections 24A–F contive properties responsive to radiation. The bridges 24 in FIG. 1 correspond to a seriesof connections 24A–F connecting diodes 29A–F with another series of conventional diodes 28A–F. The diodes 28A–F correspond to the PN junctions 28.

Another series of diodes 26A–F correspond to portions of PN junction 26, while a series of diodes 27A–F correspond to junction 27. Diodes 26, 27 and 28 are connected in FIG. 2 by a group of nodes 12A–F, corresponding to the layer 12 in FIG. 1 which exhibits a high resistivity corresponding to an equivalent high resistance between nodes 12. In the drawing in FIG. 2 this equivalent resistance is not shown because the ideal resistance is infinite. The pair of resistors 16A and 18A correspond to the strips 16 and 18. Diodes 26 and 27 are connected at different points along the resistors 16A and 18A. Diodes 29 are connected together along a common bus 14A corresponding to layer 14 in FIG. 1 which has a high conductivity.

A pair of batteries 42 and 44 is connected across resistors 16A and 18A respectively. Current through resistors 16A and 18A induced by batteries 42 and 44 produces linear voltage gradients illustrated by the broken lines 46 and 48.

An amplifier 50 is connected to bus 14A and performs two functions. First, amplifier 50 maintains the bus 14A at approximately ground potential due to a low input impedance. Second, the current flowing through diodes 29 and summed on bus 14A is amplified, and an output is provided on a terminal 52.

A signal source 54 is connected by a pair of lines 56 and 58 to resistors 16A and 18A respectively. The signals supplied on lines 56 and 58 are 180° out of phase as represented by a pair of waveforms 60 and 62. The absolute potential of resistors 16A and 18A are raised and lowered with respect to the ground potential by the signals supplied by source 54.

*Operation*

Having described the nature of the elements in structure 10 and circuit 40, the operation of both will be described with reference to the circuit of FIG. 2. Radiation, for example light, approachces the circuit 40 from the top as represented by an array of broken arrows 64A–F, and approaches the structure 10 from the right as indicated by an arrow 65. One of the light arrows 64D is blocked by an object 66, while the remaining light impinges on the remaining photo diodes 29A–C, 29E and 29F. In operation the photo diodes 29 are sequentially activated to sample the amount of light falling thereon.

Before considering the overall operation of circuit 40, the individual operation of a single circuit group consisting of diodes 29F, 24F, 28F, and 26F will be discussed. Assuming the potential on resistor 18A at the point of connection to diode 27F is above ground, and assuming the potential on resistor 16A at the connection of diode 26F is below ground, then diode 27F is forward biased and diode 26F is back biased. Therefore node 12F assumes the potential of resistor 18A at the connection of diode 27F which is above ground. With the voltage on node 12F above the ground potential of bus 14A the diode 28F is back biased blocking the current flow through photo diode 29F regardless of whether it is illuminated or not.

Another circuit group 29A, 24A, 26A, and 27A is now considered. Consistent with the assumed voltage gradient conditions above, let it be assumed that the potential on resistor 18A at the location of diode 27A be below ground and the potential on resistor 16A at the location of diode 26A be above ground. For this condition the diode 26A is forward biased and diode 27A is back biased. Therefore node 12A assumes the potential of the resistor 16A at the location of the connection to diode 26A. Diode 28A is back biased blocking conduction of diodes 29A regardless of whether it is illuminated or not.

From the description of the two circuit groups at the extreme ends of circuit 40 it can be seen that the nodes 12A–12F always assume the higher potential of the two reistors 16A and 18A the location where the corresponding diodes 26A–F and 27A–F are connected. At one intermediate point between the extreme ends of the circuit 40 the potential applied to a connected pair of diodes 26 and 27 is equal. Therefore the associated node 12 assumes the common, or equipotential, of the points on resistors

16A and 18A to which the corresponding diodes 26 and 27 are connected. By proper selection of the voltages supplied by signal source 54, this common potential can be made to equal the ground potential on bus 14A. In this manner, one of the nodes, for example node 12D assumes a ground potential and diode 28D is not back biased as in the two situations described above. Only photo diode 29D is thereby made responsive to the illumination applied thereto. Any photocurrent flows downward through diodes 29D and 28D and branches downward through diodes 26C and 27C in the reverse direction. Therefore the reverse bias saturation current of diodes 26 and 27 should be larger than the anticipated photocurrent.

Figure 4:
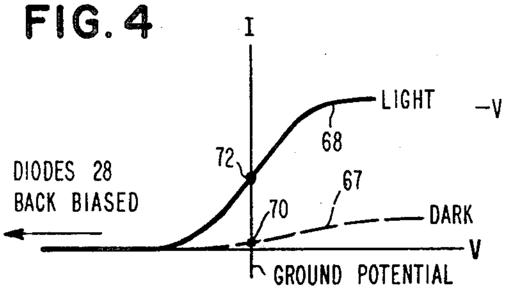
FIG. 4 is a current-voltage characteristic of an element employed in the devices of FIGS. 1 and 2.

The response of the photo diodes 29 connected in back to back relationship with the associated one of the diodes 28 is illustrated by the current-voltage characteristic curve shown in FIG. 4. Current I is plotted along the vertical axis, and voltage V is plotted along the horizontal axis. Two curves 67 and 68 represent the current flow through diodes 28 and 29 for the dark and light illumination conditions respectivey. When the diodes 28 are back biased, the current flow is substantially zero regardless of whether the photo diode 29F is illuminated or not. However, when the potential at node 12 reaches ground potential, the current flow through the photo diodes 29 depends upon their condition of illumination. If they are dark, substantially no current flows as represented by a point 70 on cure 67. However if they are illuminated an appreciable amount of current flows as represented by a point 72 on curve 68. Therefore a different amount of current would be expected to flow through photo diode 29D when it is activated, as compared to photo diodes 29A–C, 29E and 29F which do not have objects in front of them like the object 66 in front of diode 29. Accordingly amplifier 50 picks up photocurrent when all of the photo diodes 29, except diode 29D are activated providing output signals at terminal 52.

Figure 3:
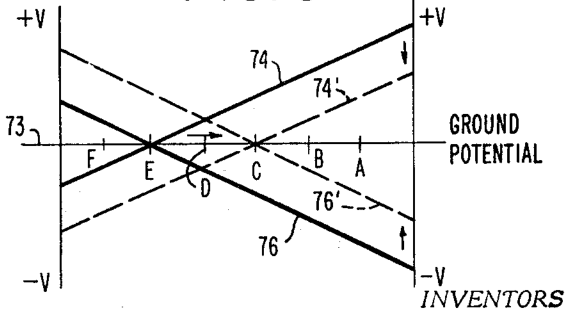
FIG. 3 is a graph illustrating the voltage gradients set up in the devices of FIGS. 1 and 2.

Signal source 54 controls the location of the ground potential along resistors 16A and 18A. To represent this operation a graph is shown in FIG. 3. Voltage is plotted along the vertical axis with a range from +V above ground 73 to −V below ground 73 along the horizontal axis a group of points A–F is plotted corresponding to the location of the connection of diodes 26A–F and 27A–F respectively. The solid line curves 74 and 76 represent the voltage gradient on resistors 16A and 18A respectively.

As shown in FIG. 3 curves 74 and 76 cross over at E on the horizontal axis. This crossover can be adjusted to coincide at ground potential 73 by translating one of the curves 74 or 76 up or down. Translation is accomplished by raising or lowering the absolute potential of the resistors 16A or 18A. The slope of the curves 74 and 76 is determined by the size of the batteries 42 and 44 and the length of the resistors 16A and 18A.

With the voltage gradient represented by curves 74 and 76 node 12E is at ground potential 73 thereby rendering photo diode 29E responsive to illumination. All other nodes except 12E assume a potential above ground 73 on either curve 76 or curve 74.

In order to move the crossover from E to C curve 74 is translated downward to the position represented by a curve 74′, and curve 76 is translated upward to the position represented by a curve 76′. The amount of translation is selected so that curves 74′ and 76′ cross over at ground potential 73. This translation is accomplished by signal source 54 which lowers the potential on line 56, and at the same time raises the potential on line 58. The changes in the voltage on lines 56 and 58 must be in the opposite direction in order to maintain the crossover along the ground potential 73. The out-of-phase changes in voltage on lines 56 and 58 are represented by waveforms 60 and 62. As waveform 60 decreases, waveform 62 increases in an inverted, or 180° out of phase, fashion.

The operation of the circuit 40 in response to waveforms 60 and 62 causes the crossover to sweep from left to right on ground potential line 73 in FIG. 3, flying back rapidly to repeat the sweep in a cyclic fashion. For such operation the output signal on terminal 52 is represented by a pair of waveforms 78 illustrating two cycles of the operation. Five pulses are produced at the output terminal 52 during each cycle of operation, one for each of the photo diodes 29A–C, 29E and 29F. The missing pulses in waveform 78 are due to the absence of photocurrent through diode 29E caused by the object 66 which blocks the light ray 64D.

Signal source 54 can provide waveforms other than the ramp type waveform 60 and 62. For example sinusoidally varying waveforms 180° out of phase may be applied to lines 56 and 58 to cause the crossover of voltage gradients 74 and 76 to sweep back and forth on ground line 73 in a sinusoidally varying motion. Also, the voltages on lines 56 and 58 can be maintained constant causing the crossover to be held in suspension at any selected point along the ground line 73 corresponding to a random access capability to any area of radiation 64. For this operation of circuit 40 only one of the photo diodes 29A–F would be activated for monitoring the variations in illumination in a single area over a period of time.

The size of the area monitored may be widened by translating one of the curves 74 or 76 downward causing the crossover to occur below ground 73. This would activate a number of adjacent photo diodes 29 causing the equivalent of aperture control of circuit 40. Alternatively the voltage on bus 14A can be raised (by means not shown) to accomplish the same aperture control. Such control is advantageous where a rough view is desired first, followed by a narrow more detailed inspection.

Blanking of the circuit 40, or rendering it totally uneffected by illumination may be accomplished by translating one of the curves 74 or 76 upward so that the crossover occurs above ground 73. For this condition all of the blocking diodes 28 are reverse biased. One application of this feature would be during flyback of the crossover from right to left at the beginning of a new cycle.

It can be seen that the circuit including resistors 16 and 18, diodes 26 and 27, batteries 42 and 44, and signal source 54 provides an efficient means for generating a voltage having a "trough" shaped distribution. Referring to FIG. 3 the "trough" is represented by the portions of curves 74 and 76 above ground 73. This "trough" shaped voltage distribution appears at nodes 12A through 12F and can be used to drive many types of circuits in addition to the diodes 28 and 29; for example, this circuit is employed in the scanner of the above application Serial No. 460,081.

In describing the structure 10 in FIG. 1, p-type and n-type material were assigned to the particular layers. However each of the layers can be formed with the opposite type material. For this modification the voltage distribution through layer 12 and through nodes 12A–F would be reversed, resembling a "gable" instead of a "trough" as in the case of the present illustrative embodiment.

The rays 64 in FIG. 2 were referred to as light rays. However the diodes 29 can be made responsive to other radiation. Additionally, the diodes 29 need not have unilaterally conducting properties since blocking diodes 24 already limit the direction of current flow through each series branch. Therefore diodes 29 may be replaced with photoresistors. Still another modification to the properties of diodes 29 can be made when it is desired to emit light instead of responding to light. Here photo diodes 29 are replaced with light emitting sources such as gallium arsenide, or phosphide type emitting sources. Amplifier 50 can be made to control the brightness of the emission by varying the current through the emitting sources. Therefore the present invention can be applied where a conversion of radiation into electrical signals is desired, or a conversion of electrical signals into radiation is desired.

While the regions 20 in FIG. 1 are shown to be on the inner side of layer 12, it is possible to form the row of regions 20 on the outer side of layer 12 between strips 16 and 18. This has the advantage of providing a more pointed "trough" or "peaked" voltage distribution.

Other modifications are suggested in the above identified application, Ser. No. 460,081, such as, the superposition of an RF signal on the current flowing through photo diodes 29. This may be accomplished in this embodiment by superimposing an RF signal on waveforms 60 and 62. The RF signal would pass through any activated photo diode 29 receiving illumination. The amplifier 50 is provided with an RF filter for detecting the presence of the RF signal on the bus 14A. For this modification the output signal on terminal 52 would resemble the waveform 78 where the peaks represent the envelope of an RF signal burst.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A scanner comprising:

a plurality of circuit groups each including a first, a second, a third, and a fourth element, each said element having a first and a second end, and one of said third and said fourth elements having radiation converting properties and the remaining elements having unilateral conducting properties, and means for joining the first ends of said first, second, and third elements together and for joining the second ends of said third and fourth elements together;

voltage gradient means for providing an ascending series of voltage levels and a descending series of voltage levels, each level of said ascending series being applied to a different one of the second ends of said first elements, and each level of said descending series being applied to a different one of the second ends of said second elements; and means connected to the first ends of said fourth elements for providing a reference potential at a voltage level included within the series of said ascending and descending levels, and for monitoring the amount of current flowing through said third and fourth elements.

2. Apparatus as defined in claim 1 wherein said plurality of circuit groups are arranged side by side in a continuous structure and said ascending and descending voltages are a continuous series.

3. Apparatus as defined in claim 1 wherein said ascendind and descending series of voltage levels change with respect to time and are 180° out of phase with one another.

4. A scanner comprising;

a plurality of circuit groups each including a first, a second, a third, and a fourth element, each said element having a first and a second end and one of said third and fourth elements having radiation converting properties and the remaining elements having unilaterally conducting properties, and means for joining the first ends of said first, second and third elements together and for joining the second ends of said third and fourth elements together;

a first, and a second resistive means for attenuating signals applied thereacross, said first resistive means having each one of the second ends of said first elements connected thereto at different locations, and said second resistive means having each one of the second ends of said second elements connected thereto at different locations;

signal generating means for applying signals to said first and second resistive means to produce a series of voltage levels on said first elements which progressively increases from left to right through said sequentially located circuit groups, and to produce a series of voltage levels on said second elements which progressively decreases from left to right through said sequentially located circuit groups; and means connected to the first ends of said fourth elements to provide a reference potential at a voltage level included within both said series of voltage levels and for monitoring the amount of current flowing through said third and fourth elements.

5. Apparatus as defined in claim 4 wherein said plurality of circuit groups are arranged side by side in a continuous structure and said series of voltage levels are a continuous series.

6. Apparatus as defined in claim 4 wherein the series of voltage levels on said first and second elements change with respect to time and are 180° out of phase with one another.

7. A scanner comprising:

a plurality of circuit groups each including a first, a second, a third, and a fourth element, each said element having a first and a second end and one of said third and fourth elements having radiation converting properties and the remaining elements having unilaterally conducting properties, and means for joining the first ends of said first, second, and third elements together and for joining the second ends of said third and fourth elements together;

a first and a second resistive means each for attenuating signals applied across first and second outer terminals thereof, said first resistive means having each one of the second ends of said first elements connected thereto at different locations, and said second resistive means having each one of the second ends of said second elements connected thereto at different locations;

signal generating means for applying signals across the first and second terminals of both said resistive means, to cause current to flow from the first to the second terminal of said first resistive means, and to cause current to flow from the second to the first terminal of said second resistive means; and means connected to the first ends of said fourth elements to provide a reference potential at a level included within the range of signals supplied by said signal generating means and for monitoring the amount of current flowing through said third and fourth elements.

8. Apparatus as defined in claim 7 wherein said plurality of circuit groups are arranged side by side in a continuous structure making a continuous connection to said resistive means.

9. Apparatus as defined in claim 7 wherein the signals applied by said generating means across the first and second resistive means vary with time and are 180° out of phase with one another.

10. Apparatus as defined in claim 7 wherein said signal generating means maintains the amount of current flowing through said resistive means constant, while varying the absolute potential of the first and second terminals of said first resistive means in a time varying manner 180° out of phase with changes induced in the absolute potential of the first and second terminals of said second resistive means.

11. Apparatus as defined in claim 10 wherein the changes in absolute potential of the terminals of said first and second resistive means are equal and opposite to the changes in absolute potential of the terminals of said second resistive means.

12. Apparatus as defined in claim 11 wherein said reference potential is selected to be equal to that voltage level which is simultaneously present at a pair of first and second elements of the same circuit group.

13. A device for scanning comprising:

first, second, and third semiconductor materials arranged with said second semiconductor material sandwiched between said first and third semiconductor materials, the porperties of said first, second, and third semiconductor material being selected to form semiconductor junctions at the locations where the materials meet, one of said semiconductor junctions having radiation converting properties, and the remaining junction having unilaterally conducting properties;

two strips of semiconductor material joined to said first semiconductor, the properties of said strips being selected to form elongated asymmetrically conductive semiconductor junctions at the locations where the strips join said first semiconductor, and the properties of said strips being further selected to attenuate signals applied thereacross, whereby the application of oppositely poled signals to said strips renders conductive the junctions between said first, second and third semiconductor material in a single localized area, the conduction in said area being a function of the radiation applied thereto.

14. A device as defined in claim 13 wherein said first semiconductor material is in the form of a continuous layer exhibiting a high resistance.

15. A device as defined in claim 14 wherein said third semiconductor material is in the form of a continuous layer exhibiting high conductance.

16. A device as defined in claim 14 further characterized by the addition of:

signal generating means for applying oppositely directed signals through said strips; and amplifying means for establishing a reference potential on said third semiconductor material at a level within the range of signals supplied by said generating means, and for providing an output signal indicative of the amount of current flowing through the junctions between said first, second and third semiconductor materials.

17. A device as defined in claim 14 further characterized by the addition of:

signal generating means for maintaining oppositely directed current flow of constant magnitudes through said strips and for periodically varying the absolute potential of said strips 180° out of phase with one another; and means for establishing a reference potential on said third semiconductor material at a level equal to the potential at that area in said first semiconductor layer where adjacent portions of said two strips are at the same potential, and for monitoring the amount of current flowing through the junctions between said first, second and third semiconductor materials at the location of said area.

18. A device as defined in claim 17 wherein the magnitude of the constant current flowing through said strips are selected to produce the same potential drop across both of said strips.

19. A circuit for generating a pointed voltage distribution comprising:

a plurality of circuit groups each including a first, and a second unilaterally conducting element, each said element having a first and a second end, and means for joining the first ends of said first and second elements together;

a first and a second resistive means for attenuating signals applied thereacross, said first resistive means having each one of the second ends of said first elements connected thereto at different locations, and said second resistive means having each one of the second ends of said second element connected thereto at different locations; and signal generating means for applying signals to said first and second resistive means to produce a series of voltage levels on said first elements which progressively increase from left to right through said sequentially located circuit groups, and to produce a series of voltage levels on said second elements which progressively decrease from left to right through said sequentially located circuit groups, whereby a voltage distribution having a pointed shape is produced at the joints between the first and second elements.

20. Apparatus as defined in claim 19 wherein said plurality of circuit groups are arranged side by side in a continuous structure and said series of voltage levels are a continuous series.

21. Apparatus as defined in claim 19 wherein a series of voltage levels on said first and second elements change with respect to time and are 180° out of phase with one another.

22. A circuit for generating a pointed voltage distribution comprising:

a plurality of circuit groups each including a first and a second unilaterally conducting element, each said element having a first and a second end, and means for joining the first ends of said first and second elements together;

a first and a second resistive means for attenuating signals applied across first and second outer terminals thereof, said first resistive means having each one of the second ends of said first elements connected thereto at different locations, and said second resistive means having each one of the second ends of said second elements connected thereto at different locations; and signal generating means for applying signals across the first and second terminals of both said resistive means, to cause current to flow from the first to the second terminal of said first resistor means and to cause current to flow from the second to the first terminal of said second resistor means, whereby a pointed voltage distribution is generated at the joints between said first and second elements.

23. Apparatus as defined in claim 22 wherein said plurality of circuit groups are arranged side by side in a continuous structure making a continuous connection to said resistive means.

24. Apparatus as defined in claim 22 wherein the signals applied by said generating means across the first and second resistive means vary with time and are 180° out of phase with one another.

25. Apparatus as defined in claim 22 wherein said signal generating means maintains the amount of current flowing through said resistive means constant, while varying the absolute potential of the first and second terminals of said first resistive means in a time varying manner 180° out of phase with changes induced in the absolute potential of the first and second terminals of said second resistive means.

26. Apparatus as defined in claim 25 wherein the changes in absolute potential of the terminals of said first and second resistive means are equal and opposite to the changes in absolute potential of the terminals of said second resistive means.

27. A circuit for generating a pointed voltage distribution comprising:

a first layer of semiconductor material;

two strips of semiconductor material joined to said first semiconductor, the properties of said strips and layer being selected to form elongated asymmetrically conductive semiconductor junctions at the locations where the strips join said first semiconductor, and the properties of said strips being further selected to attenuate signals applied thereacross, whereby a pointed voltage distribution is formed in said layer intermediate said strips.

28. A device as defined in claim 27 further characterized by the addition of:

signal generating means for applying oppositely directed signals through said strips.

29. A device as defined in claim 27 further characterized by the addition of:

signal generating means for maintainig oppositely directed current flow of constant magnitude through said strips and for periodically varying the absolute potential of said strips 180° out of phase with one another whereby the point in said voltage distribution is periodically varied along the length of said strips.

References Cited

UNITED STATES PATENTS

| | | | |
|---|---|---|---|
| 2,773,980 | 12/1956 | Oliver | 328—150 |
| 3,088,040 | 4/1963 | Newhouse | 307—245 |
| 3,210,548 | 10/1965 | Morrison. | |
| 3,317,733 | 5/1967 | Horton et al. | |
| 3,328,601 | 6/1967 | Rosenbaum. | |

RALPH G. NILSON, *Primary Examiner.*

M. A. LEAVITT, *Assistant Examiner.*